(12) United States Patent
Faruque et al.

(10) Patent No.: US 10,131,301 B2
(45) Date of Patent: Nov. 20, 2018

(54) PASSIVE ENERGY ABSORBER STRUCTURE ADAPTABLE TO MANAGE IMPACT ENERGY FOR DIFFERENT DEFORMATION TARGETS AND LOADS

(71) Applicant: FORD GLOBAL TECHNOLOGIES, LLC, Dearborn, MI (US)

(72) Inventors: Mohammed Omar Faruque, Ann Arbor, MI (US); James Chih Cheng, Troy, MI (US)

(73) Assignee: FORD GLOBAL TECHNOLOGY, LLC, Dearborn, MI (US)

( * ) Notice: Subject to any disclaimer, the term of this patent is extended or adjusted under 35 U.S.C. 154(b) by 95 days.

(21) Appl. No.: 15/451,894

(22) Filed: Mar. 7, 2017

(65) Prior Publication Data

US 2018/0257587 A1   Sep. 13, 2018

(51) Int. Cl.
*B60R 19/18* (2006.01)
*B60R 19/26* (2006.01)
*B60R 19/02* (2006.01)

(52) U.S. Cl.
CPC .......... *B60R 19/18* (2013.01); *B60R 19/023* (2013.01); *B60R 19/26* (2013.01); *B60R 2019/264* (2013.01)

(58) Field of Classification Search
CPC ....... B60R 19/02; B60R 19/023; B60R 19/18; B60R 19/34
USPC ................. 293/109, 121, 132, 133
See application file for complete search history.

(56) References Cited

U.S. PATENT DOCUMENTS

| 6,065,786 | A | * | 5/2000 | Wheatley | ................ B60R 19/16 293/109 |
| 6,152,503 | A | * | 11/2000 | Jang | ........................ B60R 19/16 293/125 |
| 6,299,227 | B1 | * | 10/2001 | Kroning | ................... B60R 19/26 293/132 |
| 8,287,011 | B2 | | 10/2012 | Cormier et al. | |
| 9,376,074 | B2 | | 6/2016 | Hundley et al. | |
| 2004/0051321 | A1 | * | 3/2004 | Hanai | ..................... B60R 19/26 293/132 |

FOREIGN PATENT DOCUMENTS

DE   2441557      3/1976
JP   2010078062   4/2010

* cited by examiner

*Primary Examiner* — Jason S Daniels
(74) *Attorney, Agent, or Firm* — Jason Rogers; Brooks Kushman P.C.

(57) ABSTRACT

An energy absorber is disclosed that includes a container that receives a plurality of tubular segments and at least one spacer. The container includes one side that is adapted to receive an impact from a first direction. The tubular segments are assembled into the container in a parallel array with a cylindrical axis-C of the segments oriented perpendicular to the first direction. The spacer is placed in the container with the tubular segments being arranged to be displaced within the container so that they compress the spacer when the impact force is received on the one side. The method of making the energy absorber comprises assembling the plurality of tubular segments having in a container and assembling at least one spacer inside the container to hold the tubular segments in place.

19 Claims, 6 Drawing Sheets

PASSIVE ENERGY ABSORBER STRUCTURE ADAPTABLE TO MANAGE IMPACT ENERGY FOR DIFFERENT DEFORMATION TARGETS AND LOADS

TECHNICAL FIELD

This disclosure relates to energy absorbing structures that are particularly applicable to vehicles that are required to meet collision test requirements with different size targets having different masses at different speeds.

BACKGROUND

Passive energy absorbers are utilized in a wide variety of application on a vehicle to absorb the impact energy from a collision and manage crash energy and the resultant deformation of the vehicle. An energy absorber may be included as part of a bumper assembly, a door beam, an interior bolster, an arm rest, or the like. A bumper assembly is one example of an energy absorber that is subject to many tests.

One example of a test of a bumper assembly is the low velocity bumper impact test in which an impactor that is between 0.4-0.6 meters wide and having a mass equal the vehicle curb weight and with a speed of the impact of 4 kpm. The purpose of this test is to minimize axial deformation and thereby minimize damage to the bumper and other structures rear of the bumper.

Another example of a test of a bumper assembly is an RCAR association test that measures the damage to a vehicle in which an impactor has a width equal to about 40% of the width of the bumper and having a mass equal the vehicle curb weight and with a speed of the impact of 15 kph. The purpose of this test is to limit axial deformation so that it is contained within the energy absorber to minimize vehicle front end damage.

Another example of a test of a bumper assembly is a pedestrian leg impact test that measures the extent of cushioning provided for an impact with a pedestrian's leg. The extent of cushioning is measured in an impact with a pedestrian leg impactor having a width of 75-90 mm at the widest point and having a mass of about 13.8 kg and with a speed of the impact of 40 kph. The purpose of the test is to test the ability of the energy absorber to minimize leg injuries by reducing the impact force through a greater degree of deformation.

Conventional energy absorbers may fail some of the above test but pass the other tests because the required stiffness to pass some tests necessitates failure in the other tests that require compliance.

This disclosure is directed to solving the above problems and other problems as summarized below.

SUMMARY

According to one aspect of this disclosure, an energy absorber is disclosed that comprises a container that receives a plurality of tubular segments and a spacer. The container includes one side that is adapted to receive an impact from a first direction. The tubular segments are relatively rigid and are assembled into the container in a parallel array with a cylindrical axis-C of the segments oriented perpendicular to the first direction. The spacer is placed in the container with the tubular segments being arranged to be displaced within the container so that they compress the spacer when the impact force is received on the one side.

According to other aspects of this disclosure, the spacer may be a low density soft foam spacer assembled into the container that holds the tubular segments in place within the container. The foam spacer may define a plurality of spaced openings that each receive one of the tubular segments. The foam spacer may be a layer of foam disposed on at least one side of a row of the tubular segments in the parallel array. The foam spacer may be a plurality of layers of foam disposed between adjacent rows of tubular segments. The foam spacer may further comprise a plurality of layers of foam disposed between a wall of the container and a row of the tubular segments.

Alternatively, the spacer may comprise a plurality of walls connecting adjacent segments in the parallel array. The walls may be adapted to break prior to substantial deformation of the tubular segments when the impact force is applied to the one side to facilitate displacement of the tubular segments. Substantial deformation as defined herein is deformation that results in fracturing the tubular segments.

The container may include an impact receiving surface on the one side, a top wall on an upper side, a bottom wall on a lower side, and an attachment surface opposite the impact receiving surface. The cylindrical axis-C of the tubular segments may extend between the top wall and the bottom wall and the attachment surface is attached to a bumper beam.

According to another aspect of this disclosure, a method is disclosed for making an energy absorber. The method comprises the steps of providing a container, inserting a spacer in the container and inserting a plurality of tubular segments into the container. The segments have a cylindrical axis-C and the spacer retains the tubular segments in an array with each cylindrical axis-C being oriented parallel to the cylindrical axis-C of the other tubular segments and perpendicular to the direction of the impact applied to receiving surface of the container.

The method may further comprise extruding a plurality of links connecting adjacent segments in the array, wherein the links break prior to substantial deformation of the tubular segments to facilitate displacement of the tubular segments primarily along two directions within the container when an impact force is applied to the impact receiving surface.

The spacer may be a low density soft foam spacer and the step of inserting the spacer in the container is performed by placing the foam spacer in the container to be disposed on at least one side of a row of the tubular segments in the array. Alternatively, the spacer may be a foam spacer and the step of inserting the spacer in the container may be performed by placing the foam spacer in the container between adjacent rows of rows of the tubular segments in the array.

According to another aspect of the method, the method may further comprise forming the spacer of a low density soft foam material that defines a plurality of openings that are adapted to retain the tubular segments in the array.

According to another aspect of this disclosure as it relates to another method of making an energy absorber, the method may comprise assembling a plurality of tubular segments having a cylindrical axis-C in a container and assembling at least one spacer inside the container to hold the tubular segments in place. The plurality of tubular segments in the container include an outer wall with the cylindrical axis-C of the tubular segments each being oriented parallel to each other and extending in a vertical direction. The spacer holds the tubular segments in place in the container until an impact force is applied to the outer wall.

The method may further comprise forming the spacer of a foam material with a plurality of openings defined in the foam material for receiving the tubular segments. When the impact force is applied to the container the tubular segments move within the container to absorb the impact force.

The step of forming the spacer may be performed by expanding the foam material around the tubular segments in-situ after the tubular segments are assembled into the container. Alternatively, the step of assembling the at least one spacer may be performed by inserting the spacer in the container in contact with at least one side of a row of the segments.

The spacer may include a plurality of links connecting adjacent tubular segments. The links and tubular segments may be formed by extruding the tubular segments and the plurality of walls. The links are designed to easily break to facilitate displacement of the tubular segments within the container when an impact force is applied to outer wall of the container.

The step of assembling the plurality of tubular segments in the container may further comprise inserting a first module including a first portion of the plurality of tubular segments connected by a first portion of the plurality of walls into the container. After the first module is inserted, a second module including a second portion of the plurality of tubular segments connected by a second portion of the plurality of walls may be inserted into the container.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
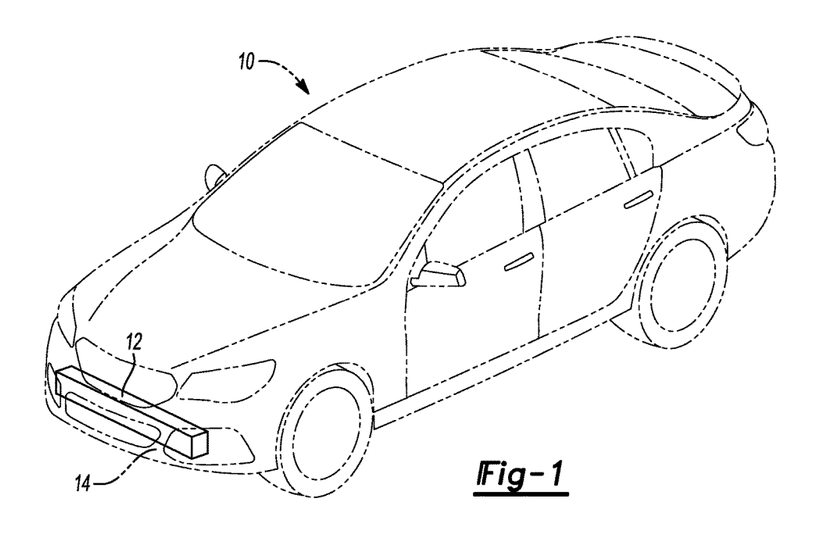
FIG. 1 is a front/left perspective view of a vehicle in phantom with an energy absorber made according to one aspect of this disclosure.

Referring to FIG. 1, a vehicle shown in phantom lines is generally indicated by reference numeral 10. An energy absorber 12 is shown assembled to the front end of the vehicle 10 behind a front fascia 14.

Figures 2, 3:
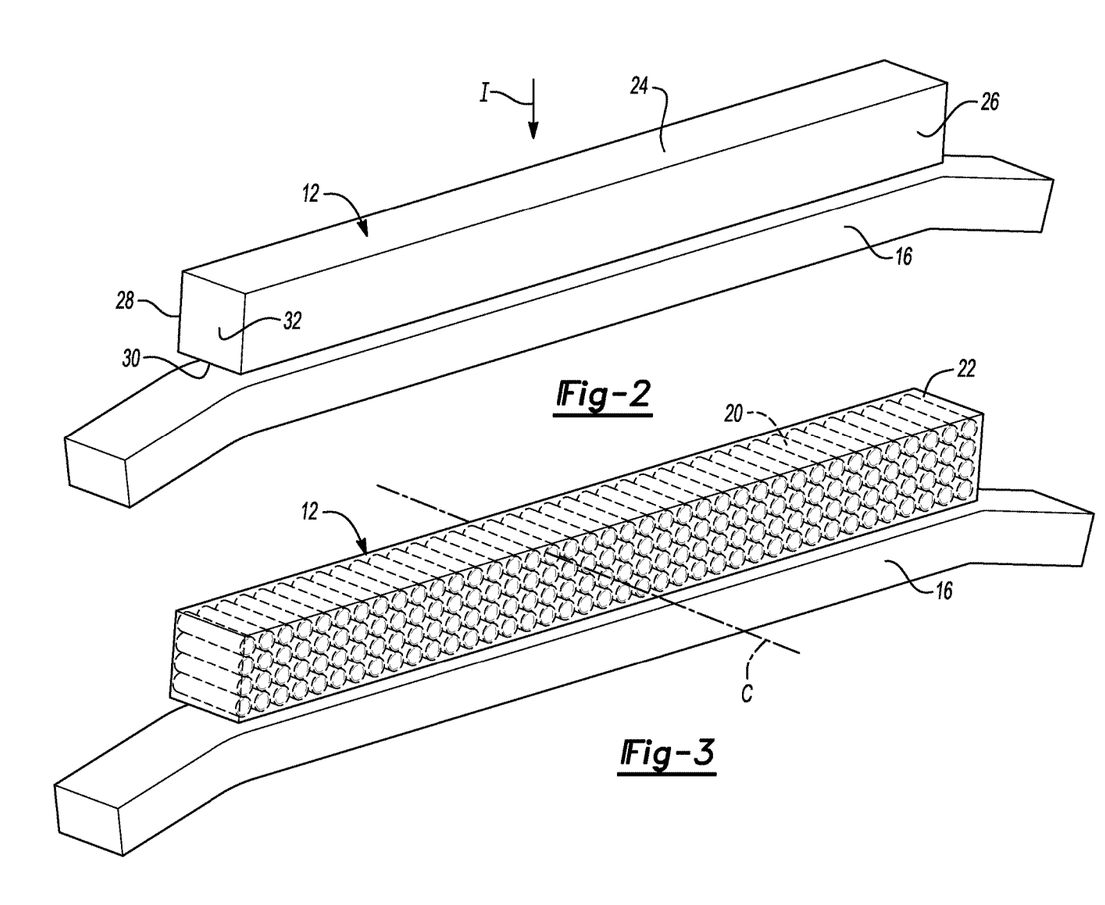
FIG. 2 is a diagrammatic perspective view of the energy absorber of FIG. 1 attached to a bumper.
FIG. 3 is a diagrammatic perspective view of the energy absorber of FIG. 1 showing a plurality of tubular segments in phantom that are disposed in a container attached to a bumper.

Referring to FIGS. 2 and 3, the energy absorber 12 is shown assembled to a bumper beam 16. The energy absorber 12 is attached to a front surface of the bumper beam 16 and may be shaped to conform to the contour of the bumper beam 16. The energy absorber 12 is disposed between the bumper beam 16 and the front fascia 14 (shown in FIG. 1).

As shown in FIG. 3, the energy absorber 12 is shown to include a plurality of relatively rigid tubular segments 20 that each include a cylindrical axis-C. Hard plastic pipes of chosen diameter can be cut to size to make the tubular inserts. The cylindrical axis C extends in a vertical direction and the cylindrical axes-C of the segments are parallel to one another. The tubular segments 20 are contained within a container, as shown in FIG. 2.

Referring to FIG. 2, the energy absorber 12 is shown being attached to the bumper beam 16. The energy absorber 12 includes the container 22 that contains the tubular segments 20 as shown in FIG. 3. The container 22 includes an impact receiving wall 24, or outer wall, a top wall 26, a bottom wall 28 and an attachment wall 30. The container 22 may also include an end wall 32 that closes off the lateral ends of the container 22.

Figure 4:
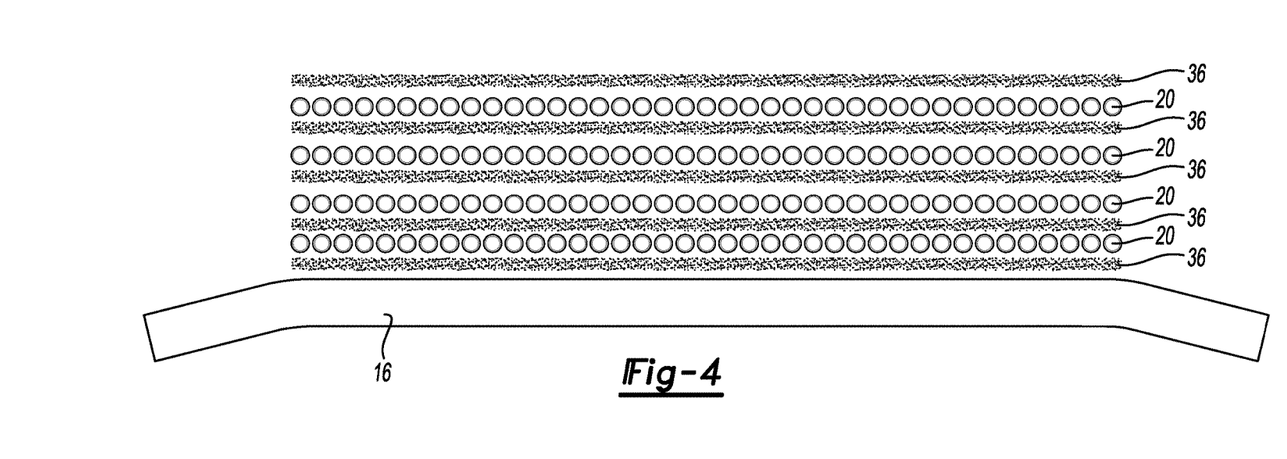
FIG. 4 is a diagrammatic perspective view of the energy absorber showing the plurality of tubular segments and foam spacer layers with the container removed and attached to a bumper.

Referring to FIG. 4, an array of tubular segments 20 is shown with the container 22 (shown in FIG. 2) removed for visibility. A transverse foam layer 36 is shown between the tubular segments 20 and the bumper beam 16. It should be understood that additional transverse foam layers 36 may be provided between each of the rows of tubular segments 20 and may also be provided between the forward most row of tubular segments 20 and a wall of the container 22.

The foam layers 36 provide space within the container 22 to allow the tubular segments 20 to be displaced. When an impact direction indicated by the arrow I in FIG. 4 is applied to the energy absorber, the tubular segments 20 are displaced within the container 22 to absorb the energy from the impact. The transverse foam layer 36 also functions to hold the tubular segments 20 in place within the container and minimizes any potential for noise caused by movement of the tubular segments 20 within the container 22 by preventing displacement of the tubular segments 20 except for when an impact I is applied to the energy absorber 12.

Figure 5:
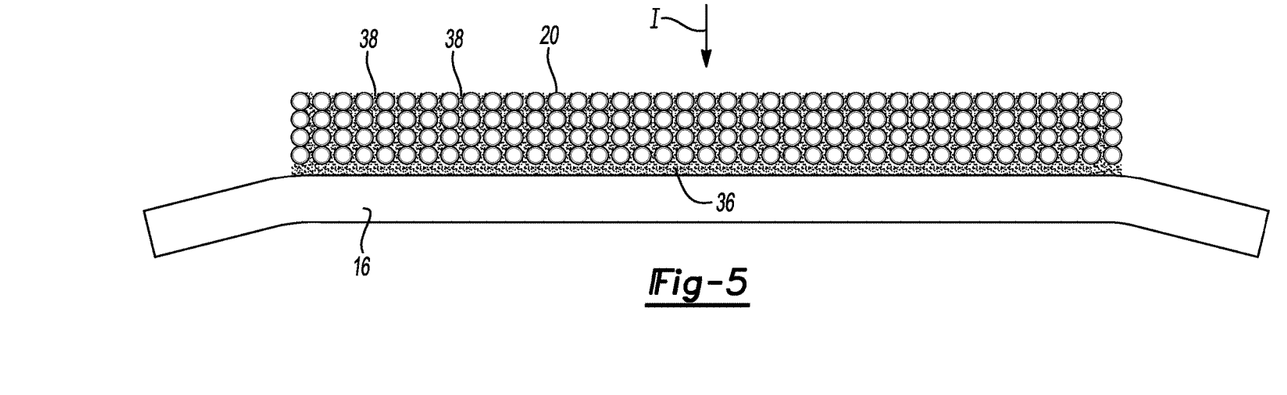
FIG. 5 is a top plan view of the energy absorber showing a plurality of tubular segments and foam spacer layers with the container removed and attached to a bumper.

Referring to FIG. 5, an alternative arrangement of the tubular segments 20 is shown with the tubular segments 20 being retained on the bumper beam 16. A transverse foam layer 36 is shown between the tubular segments 20 and the bumper beam 16. A plurality of longitudinal foam layers 38 are shown between the columns of tubular segments 20. The longitudinal foam layers 38 may be provided between each column of tubular segments 20 or may be provided between only some of the columns of tubular segments 20 at spaced intervals. The rows of tubular segments 20 may extend in the transverse vehicle direction or in the longitudinal direction. With reference to the embodiment of FIG. 5 above, the rows of tubular segments 20 extending in the longitudinal direction are referred to as columns and the rows of tubular segments extending in the transverse direction are referred to as rows.

Figures 6, 7, 8:
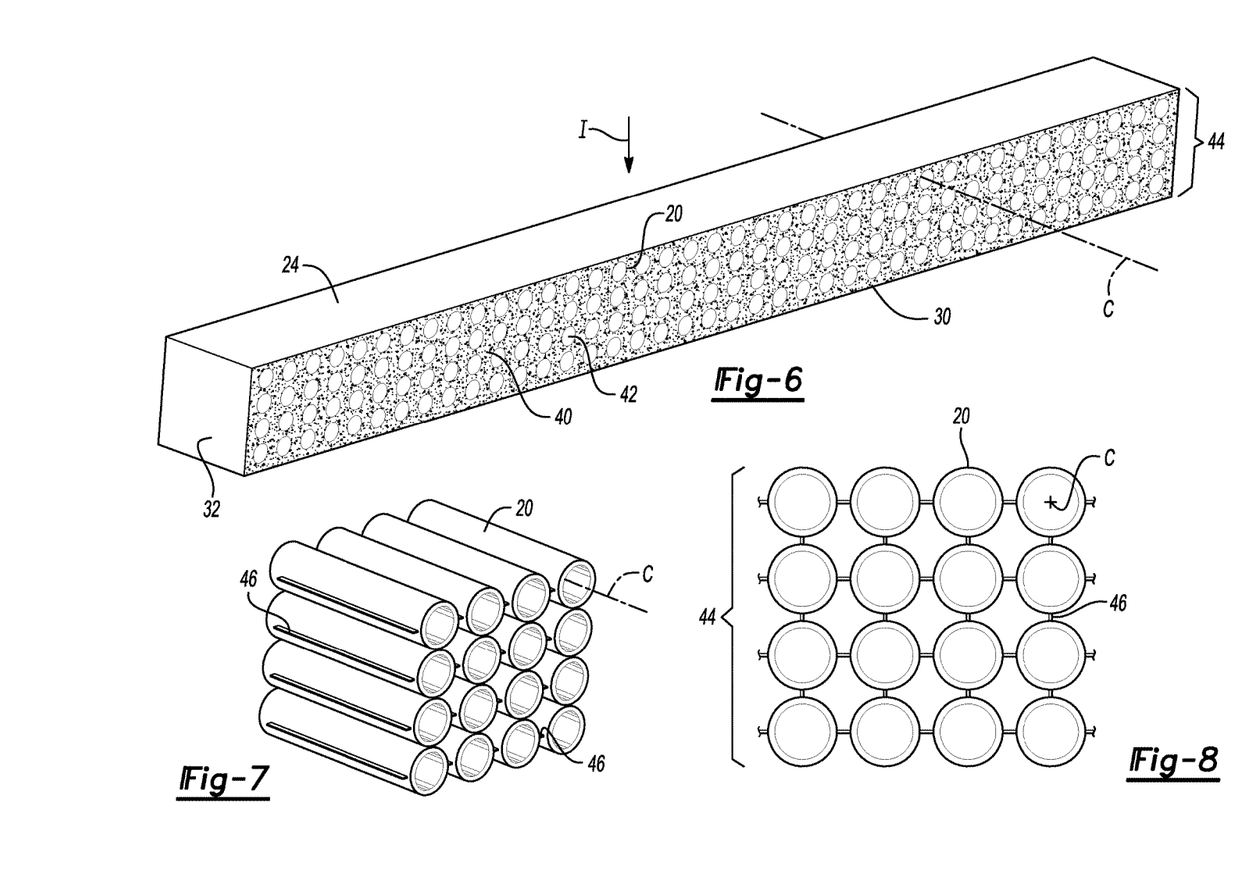
FIG. 6 is a diagrammatic perspective view of an energy absorber showing a plurality of tubular segments disposed in a foam block that defines a plurality of openings and a plurality of tubular segments disposed in the openings.
FIG. 7 is a diagrammatic perspective view of a plurality of tubular segments connected by breakable links that are adapted to break upon impact to allow the tubular segments to be displaced to absorb energy.
FIG. 8 is a fragmentary top plan view of the plurality of tubular segments connected by breakable links as shown in FIG. 7.

Referring to FIG. 6, an alternative embodiment is shown that includes a foam block 40 that defines a plurality of openings 42 that are each adapted to receive one of the tubular segments 20. The tubular segments 20 each have a cylindrical axis-C. The cylindrical axis-C of the tubular segments are perpendicular to the direction of impact indicated by the arrow I. The cylindrical axis-C of the tubular segments 20 are vertically oriented when the impact absorber is attached to a bumper of a vehicle. The openings 42 retain the tubular segments 20 in an array 44. The foam block 40 is highly compressible and offers minimal resistance to displacement of the tubular segments 20 in the event of an impact with an object. In FIG. 6, the top wall of the container 22 (shown in FIG. 2) is removed to illustrate the arrangement of the array 44 of tubular segments 20. An impact receiving wall 24, or outer wall, is shown that corresponds to the front surface of the impact absorbing member. The foam block 40 is provided with an end wall 32 as shown in FIG. 6.

Referring to FIGS. 7 and 8, another alternative embodiment is shown that includes a plurality of tubular segments 20 held in an array 44 by a plurality of thin links 46. The thin links 46 connect the tubular segments in the transverse direction and longitudinal vehicle direction. The thin links 46 are designed to break prior to any substantial deformation 20 in a collision wherein an impact is applied to one of the sides of the array of tubular segments 20. Upon impact, the tubular segments 20 are displaced breaking the thin links 46 and shifting within the container 22 (shown in FIG. 2). The tubular segments 20 are aligned with their cylindrical axis-C parallel to each other and extend in the vertical direction.

In each of the above described embodiments, the tubular segments 20 are designed to shift sideways and rearwardly within the container 22. The container 22 seals the array 44 of tubular segments 20.

The tube diameter and gauge may be varied to create a tubular segment 20 that is substantially rigid. In addition, the material properties of the tube material may be varied to change the modulus of elasticity, yield strength and ultimate strength of the tubular segments. The diameter of the tubes may be between 20-25 mm and the thickness of the tube walls is preferably between 1.5 and 2 mm thick. It is envisioned that certain hard plastic material can be used to manufacture the tubes. The foam layers, foam block and walls as described with reference to FIGS. 3-8 function to hold the tubular segments so in a spaced relationship within the container 22. The empty space between the tube is preferably from 5-20% of the volume of the space within the container 22. However, it should be understood that the percentage of empty space for a particular part can be optimized to achieve performance targets.

The energy absorber 12 consists of an array of relatively stiff tubular segments 20 that are spaced so that the total volume change is limited irrespective of the impactor size and mass and the relative velocity of the impact required in a crash test. The energy absorber undergoes different levels of deformation when the size of the impactor is changed with minimal effect on the mass and velocity changes.

This passively adaptive structural system consists of three major constituents: an array of relatively rigid tubular segments; a polymeric cover or container; and a soft spacer that maintains the spacing and positioning of the tubular segments 20 within the container 22. The tubular segments 20 are relatively stiff compared to the foam spacer(s) or thin links connecting the adjacent tubular segments 20. The tubular segments are spaced in both the transverse and longitudinal directions to limit the total volume change that occurs during an impact.

In the embodiment shown in FIG. 6, a foam matrix is provided with pre-drilled holes or openings 42. The openings 42 may also be formed by forming the foam block 40 in a die having a plurality of mandrels that the foam is formed about. The foam block holding the tubular segments is soft and does not provide any significant resistance to the displacement of the tubular segments 20 during impact.

Referring to the embodiment of FIGS. 7 and 8, the thin links 46 are frangible meaning that they are relatively weak and break easily during an impact to allow displacement of the tubular segments rearwardly and laterally within the container 22.

The embodiment of FIGS. 2-5, may be made according to a method in which the foam layers 36 and 38 may be laid into the container 22 as the tubular segments 20 are assembled into the container 22. Referring to FIG. 4, a layer of foam may be laid on the attachment wall 30 of the container 22 and a row of tubular segments 20 may be loaded into the container 22. Additional rows of tubular segments and additional transverse foam layers 36 may be laid into the container at the same time or sequentially. Referring the embodiment of FIG. 5, the foam layers may be placed into the container 22 by initially laying a longitudinal foam layer 36 against the impact wall or the attachment wall 30 and longitudinally stacked tubular segments 20 may be inserted in the container 22 with the longitudinal foam layers 38 being inserted between adjacent columns.

Referring to the foam block 40 shown in FIG. 6, the foam block 40 may be formed in a large transversely extending section as shown in FIG. 6 or may be broken into smaller arrays, or modules, and stacked within the container. For example, the long foam block shown in FIG. 6 may be divided into, for example, six or eight smaller segments, or modules, that are loaded into the container 22 one at a time to create a foam block that spans the transverse length of the bumper beam 16. Alternatively, the tubular segments 20 could be loaded into the container 22 with an expandable polymeric composition that is subsequently expanded to fill the interstitial spaces between the tubular segments 20.

The embodiment shown in FIGS. 7 and 8 may be formed in an extrusion (or pultrusion) process. Smaller groups, or modules, of the tubular segments 20 may be extruded along with the thin walls 46 through an extrusion die. A number of the modules may then be assembled together within the container 22 to provide a full width array of tubular segments 20. An advantage of the modular approach is that a smaller extrusion die may be provided to reduce tooling costs.

The adaptive behavior of the energy absorber 12 as described above was demonstrated in simulated tests of the bumper energy absorber system. The proposed concept was modeled and three impact load tests were simulated on the same energy absorber design with the results being presented in FIGS. 9-11 below.

Figure 9:
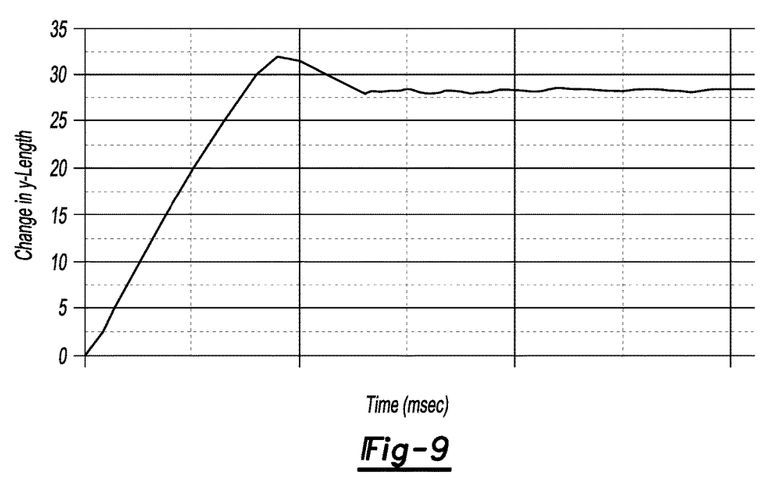
FIG. 9 is a graph showing a simulated test of an energy absorber made according to one embodiment of this disclosure with a wide, high mass impactor in a low velocity impact.

FIG. 9 provides the results of a simulated low velocity bumper impact test. The impactor width is between 16-24" and the mass of the impactor corresponds to the vehicle curb weight. The impactor is moved at a velocity of 4 kph. The vehicle is moved relative to the impactor at a velocity of 4 kph. The objective of this test is to minimize axial deformation and thereby minimize damage to the bumper beam. As shown in FIG. 9, the average deformation is relatively low and was limited to an average of approximately 26 mm.

Figure 10:
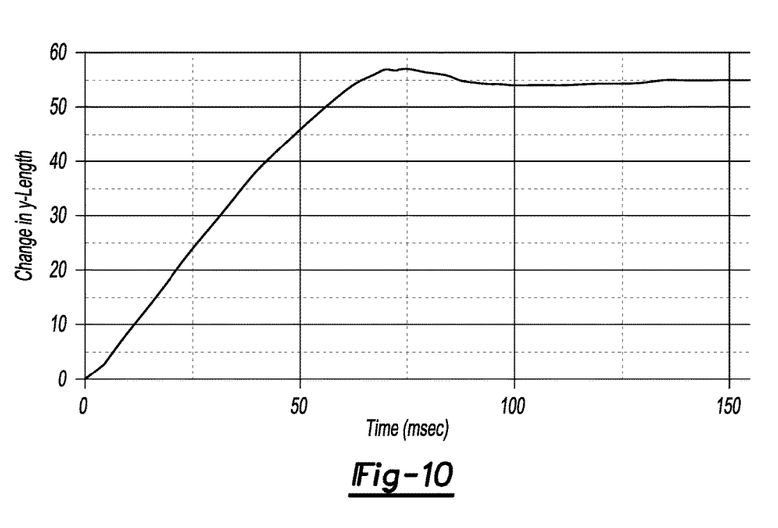
FIG. 10 is a graph showing a simulated pedestrian test of an energy absorber made according to the same embodiment that was the subject of the test of FIG. 9 tested with a narrow, low mass impactor in a high velocity impact.

FIG. 10 provides the results of a simulated pedestrian leg impact test. The rigid pedestrian leg impactor has a width of between 3-3.5" and the mass of the impactor is approximately 13.8 kg. the impactor is moved relative to the vehicle at a relative speed of 40 kph. The objective of this test is to determine the extent of leg cushioning provided by the energy absorber that allows more deformation to minimize leg injuries. As shown in FIG. 10, the simulation results indicate that the average deformation was approximately 57 mm.

Figure 11:
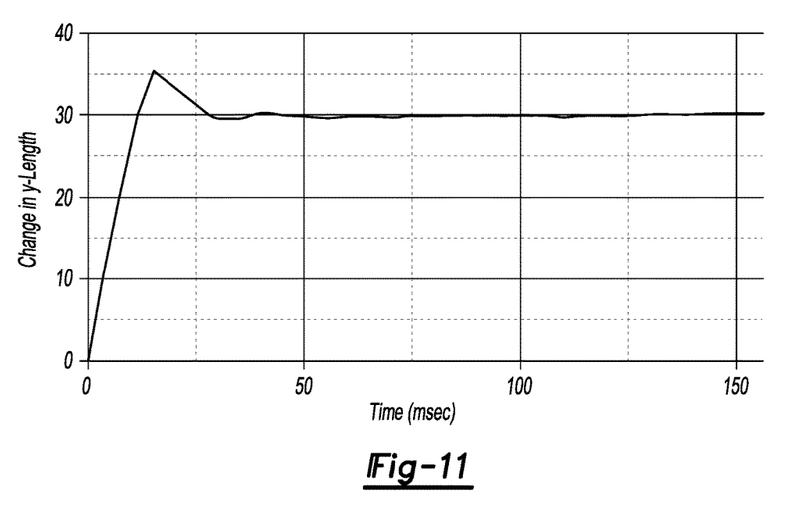
FIG. 11 is a graph showing a simulated test of an energy absorber made according to the same embodiment that was the subject of the test of FIG. 9 tested with a wide, high mass impactor in a high velocity impact.

FIG. 11 provides the results of a simulated RCAR damageability test. The impactor has a width of approximately 40% of the bumper width and has a mass corresponding to the vehicle curb weight. The impactor is moved relative to the vehicle at a velocity of 15 kph. The objective of this test is to measure the axial deformation within the energy absorber and to minimize the vehicle front-end damage including the hood. Referring to FIG. 11, the average deformation of the energy absorber is low and was limited to approximately 30 mm.

It is anticipated that a wide range of results may be attained by varying the structure, spacing, material composition and other factors to obtain the desired performance for the energy absorber in any one of a number energy absorption tests. The results of the above tests may be improved by systematically optimizing the structure of the tubular segments 20 and the spacing maintained within the container to allow for more or less displacement of the tubular segments 20.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An energy absorber comprising:
a container including one side adapted to receive an impact from a first direction;
a plurality of tubular segments assembled into the container in a parallel array with a cylindrical axis-C oriented perpendicular to the first direction; and
a spacer disposed within the container, wherein the tubular segments are displaced within the container and compress the spacer when an impact force is applied to the one side.

2. The energy absorber of claim 1 wherein the spacer is a foam spacer assembled into the container that holds the tubular segments in place within the container.

3. The energy absorber of claim 2 wherein the foam spacer defines a plurality of spaced openings that receive one of the tubular segments.

4. The energy absorber of claim 2 wherein the foam spacer is a layer of foam disposed on at least one side of a row of the tubular segments in the parallel array.

5. The energy absorber of claim 2 wherein the foam spacer is a plurality of layers of foam disposed between adjacent rows of tubular segments.

6. The energy absorber of claim 2 wherein the foam spacer further comprises:
a plurality of layers of foam disposed between a wall of the container and a row of the tubular segments.

7. The energy absorber of claim 1 wherein the spacer further comprising:
a plurality of links connecting adjacent segments in the parallel array, wherein the links are adapted to break prior to substantial deformation of the tubular segments when the impact force is applied to the one side to facilitate displacement of the tubular segments.

8. The energy absorber of claim 1 wherein the container includes an impact receiving surface on the one side, a top wall on an upper side, a bottom wall on a lower side, and an attachment surface opposite the impact receiving surface, wherein the cylindrical axis-C of the tubular segments extends between the top wall and the bottom wall and the attachment surface is adapted to be attached to a bumper beam.

9. A method of making an energy absorber comprising:
providing a container;
inserting a spacer in the container; and
inserting a plurality of tubular segments having a cylindrical axis-C into the container with the spacer retaining the tubular segments in an array with each cylindrical axis-C being oriented parallel to each other and perpendicular to a direction of an impact applied to an receiving surface of the container.

10. The method of claim 9 further comprising:
forming the spacer of a foam material that defines a plurality of openings that are adapted to retain the tubular segments in the array.

11. The method of claim 9 further comprising:
extruding a plurality of walls connecting adjacent segments in the array, wherein the walls break prior to substantial deformation of the tubular segments to facilitate displacement of the tubular segments within the container when an impact force is applied to the impact receiving surface.

12. The method of claim 9 wherein the spacer is a foam spacer and the step of inserting the spacer in the container is performed by placing the foam spacer in the container to be disposed on at least one side of a row of the tubular segments in the array.

13. The method of claim 9 wherein the spacer is a foam spacer and the step of inserting the spacer in the container is performed by placing the foam spacer in the container between adjacent rows of the tubular segments in the array.

14. A method of making an energy absorber comprising:
assembling a plurality of tubular segments having a cylindrical axis-C in a container having an outer wall with each axis-C of the tubular segments being oriented in a parallel array to each other and extending in a vertical direction; and
assembling at least one spacer inside the container to hold the tubular segments in place in the container until an impact force is applied to the outer wall.

15. The method of claim 14 further comprising:
forming the spacer of a foam material with a plurality of openings defined in the foam material for receiving the tubular segments, wherein when the impact force is applied to the container the tubular segments move within the container to absorb the impact force.

16. The method of claim 15 wherein the step of forming the spacer is performed by expanding the foam material around the tubular segments in situ after the tubular segments are assembled into the container.

17. The method of claim 14 wherein the step of assembling the at least one spacer is performed by inserting the spacer in the container in contact with at least one side of a row of the segments.

18. The method of claim 14 wherein the at least one spacer includes a plurality of links connecting adjacent tubular segments and the method further comprises:
   extruding the tubular segments and the plurality of links, wherein the links are adapted to break to facilitate displacement of the tubular segments within the container when an impact force is applied to outer wall of the container.

19. The method of claim 18 wherein the step of assembling the plurality of tubular segments in the container further comprises:
   inserting a first module including a first portion of the plurality of tubular segments connected by a first portion of the plurality of links into the container; and
   inserting a second module including a second portion of the plurality of tubular segments connected by a second portion of the plurality of links into the container after the first module is inserted into the container.

\* \* \* \* \*